May 30, 1933.  A. H. COOKE  1,911,810
PROCESS AND APPARATUS FOR TREATING FISH
Filed Dec. 7, 1929   2 Sheets-Sheet 1
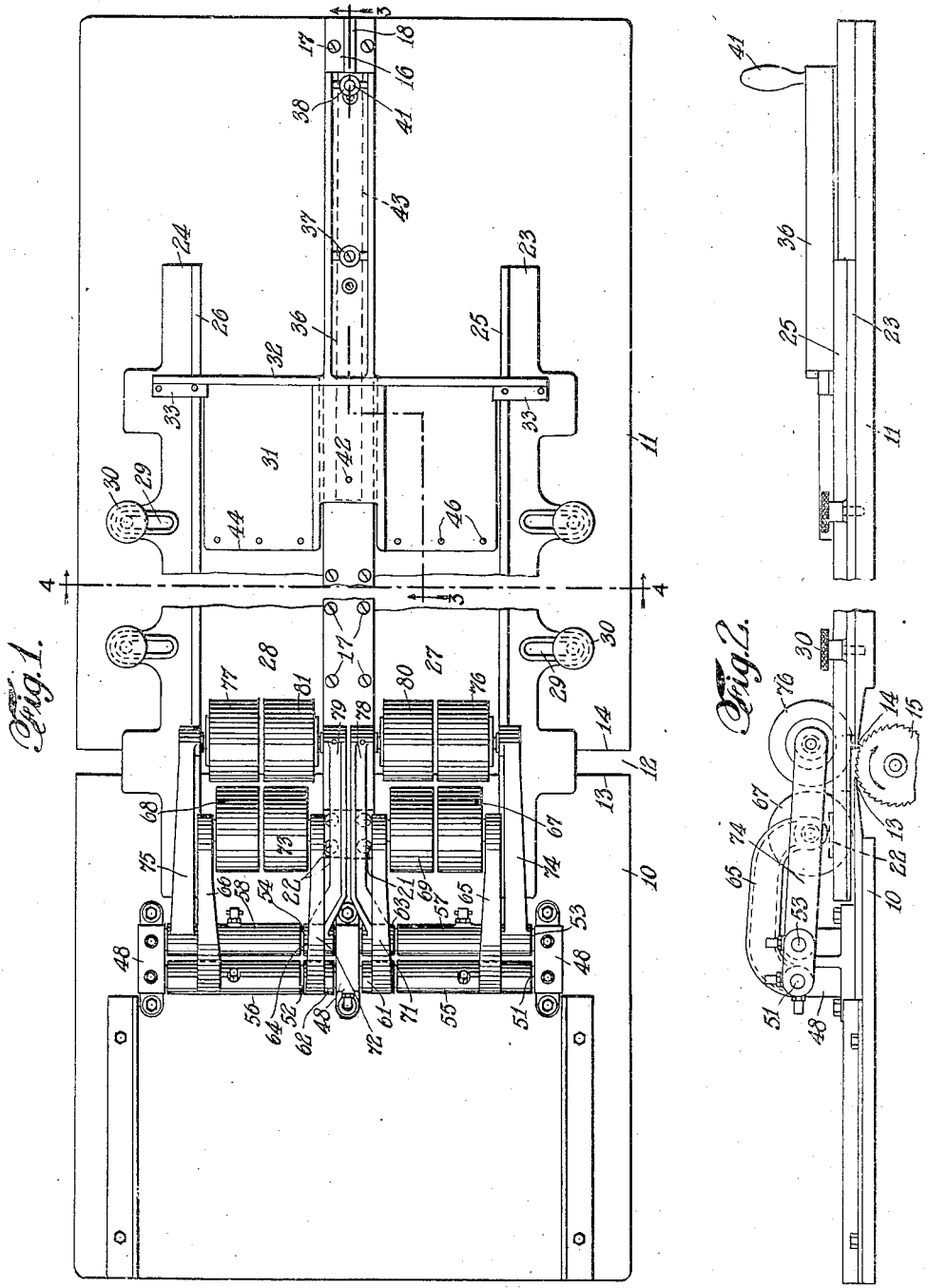

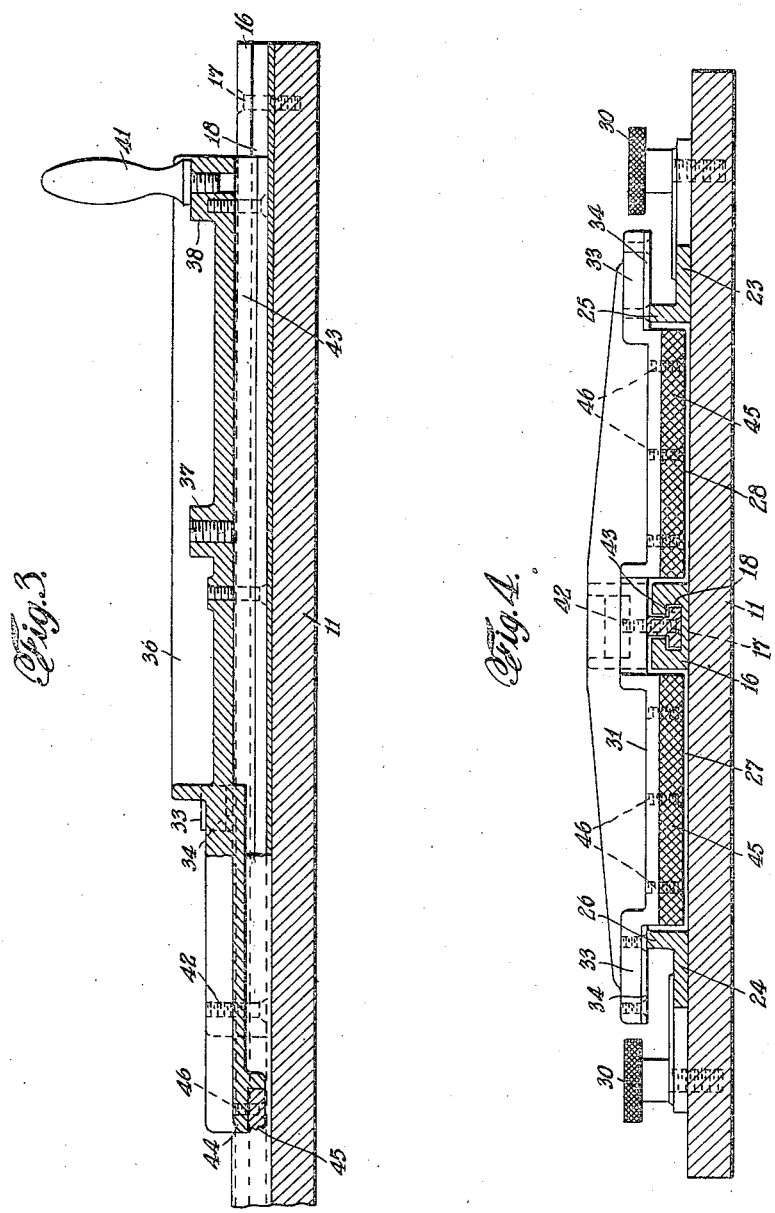

Patented May 30, 1933

1,911,810

UNITED STATES PATENT OFFICE

ALEXANDER H. COOKE, OF NEW YORK, N. Y., ASSIGNOR TO THE ATLANTIC COAST FISHERIES COMPANY, OF NEW YORK, N. Y., A CORPORATION OF MAINE

PROCESS AND APPARATUS FOR TREATING FISH

Application filed December 7, 1929. Serial No. 412,338.

This invention relates to the art of treating fish and more particularly to a new and improved process and apparatus for treating and skinning fish.

It has been found that the removal of the skin of soft fish is accompanied with a great deal of difficulty as well as a material amount of flesh loss due to the adhesion between the flesh portions and the skin.

The present invention accordingly provides a process for skinning fish fillets whereby the removal of the skin portions thereof is expedited and a higher recovery of flesh portions is effected.

The present invention also provides a process whereby mechanical means can be more easily applied to the removal of the skin portions of said fish.

The invention still further provides a simple and efficient apparatus which will expeditiously remove the skins of fillets.

According to the present invention the fish is cleaned and cut into fillets. These fillets are then frozen so that the skin surfaces thereof are rendered substantially plane. Such plane skin surfaces can be effected by placing the fillets with the skin portions adjacent and in contact with a flat slab during freezing operation. The skins of the fillets so treated can be very easily removed by mechanical means hereafter described with the resultant recovery of a greater percentage of the flesh portions of these fillets. According to the invention, such mechanical means is constituted by a device having a cutter with means for advancing fish fillets, and particularly the skin surface thereof, into the field of action of said cutter. Mounted adjacent said cutter may be disposed yieldable means for holding the fillets with their skin portions adjacent the cutter during the skinning operation.

Although novel features which are believed to be characteristic of this invention will be particularly pointed out in the claims appended hereto, the invention itself, as to its objects and advantages, the mode of its operation and the manner of its organization, may be better understood by referring to the following description taken in connection with the accompanying drawings forming a part thereof, in which:

Figure 1 is a top plan view of the apparatus;
Figure 2 is a side elevation;
Figure 3 is a section taken on line 3—3 of Figure 1; and
Figure 4 is a section taken on line 4—4 of Figure 1.

Like reference characters denote like parts in the several figures of the drawings.

In the following description and in the claims parts will be identified by specific names for convenience, but they are intended to be as generic in their application to similar parts as the art will permit.

In the process preliminary to skinning, the soft fish is cleaned and cut into fillets. These fillets are then placed upon a plane and preferably flat slab with their skin surfaces in contact with said slab. It should be noted that the skin surfaces will substantially conform with the surface of the slab. Under these conditions the fillets are subjected to any suitable freezing process. It has been found that while the fillets are in the frozen state, the skins can then be peeled or cut off very easily and that the adhesion between the skin and flesh portions has been sufficiently reduced to effect a material increase in the amount of recovery in the individual fillets. Because of the plane skin surfaces the frozen fillets are more easily adaptable to treatment by mechanical means for removal of the skin portions thereof.

In the accompanying drawings one form of mechanical means for skinning the frozen fillets is shown. It comprises bed plates 10 and 11 so disposed relative to each other that there is provided a space 12 therebetween. The opposite edges 13 and 14 of said plates are chamfered and have mounted underneath thereof a cutter 15 which may be provided with suitable means (not shown) for adjusting its relative position with respect to said plates for the accommodation of any selective thickness of skin to be removed. Extending along the bed plates 10 and 11 is a guide rail 16 which is secured to said plates by means of screws 17, and which is provided with a T-groove 18 extending longitudinally therealong. Secured to said guide rail 16 by means of screws 21 is a slab 22 for the purpose hereinafter referred to.

Mounted on the plates 10 and 11 are side guide members 23 and 24, which are provided with upstanding flanges 25 and 26. These flanges define conjointly with the guide rail 16 troughs 27 and 28, respectively. Said guide members 23 and 24 are also provided with slots 29 for the reception therein of hand screws 30 which have a threaded engagement with the bed plate 11. The position of these guide members can accordingly be adjusted by selectively positioning said slots with respect to said hand screws 30.

Slidably mounted along the troughs 27 and 28 is a pusher member 31 which is provided transversely with a rib 32, at the end of which are mounted flange members 33. Secured underneath said flange members are bearing plates 34 which are adapted to contact with the top edge of the flanges 25 and 26 so as to effect guiding means thereby. The pusher member 31 has integrally therewith an arm 36 which is provided with bosses 37 and 38 adapted to receive suitable holding means, such as a handle 41. Secured to the pusher member 31 by means of screws 42 are tongues 43 which have a T-cross-section and which are adapted to slide in the corresponding T-groove 18.

The edge 44 of the pusher 31 is angled for the reception of strips 45, which have roughened surfaces for the purpose hereinafter referred to. These strips 45 are secured to the pusher 31 by means of screws 46.

Mounted on the bed plate 10 are three brackets 48 which have journaled therethrough shafts 51, 52, 53 and 54. Loosely mounted on said shafts 51, 52, 53 and 54 are sleeves 55, 56, 57 and 58. Also mounted on the shafts 51, 52, 53 and 54 are sleeves 61, 62, 63 and 64, which are fixedly secured to their respective shafts. Integrally with the sleeves 55 and 56 are arms 65 and 66, at the free end of which are mounted respectively rollers 67 and 68; integrally connected with the sleeves 61 and 62 are arms 71 and 72 respectively, at the free end of which are mounted rollers 69 and 73; integrally connected with the sleeves 57 and 58 are arms 74 and 75 having rollers 76 and 77 mounted at the free ends thereof; and integrally secured to the sleeves 63 and 64 are arms 78 and 79 having mounted at their ends rollers 80 and 81. The rollers 76, 77, 80 and 81 are preferably mounted in axial alignment and the rollers 67, 68, 69 and 73 are also preferably arranged in axial alignment. All of these rollers have ball-bearing engagements with their respective shafts and are preferably constructed with a rubber periphery. It should be observed that each of these rollers is mounted for independent movement.

In the operation of the machine, frozen fillets are placed in either or both the troughs 27 and 28 with the skin surfaces thereof adjacent the bed plate 11. The pusher member 31, through the manipulation of the handle 41, is disposed forward, advancing thereby the fillets into the field of action of the cutter 15. As the fillets come in contact with the rollers 76, 77, 80 and 81, these rollers are independently elevated in accordance with the contour of the fillets. By making these rollers of resilient material, the periphery more readily conforms to the contour of the fillets and effects thereby a more extensive bearing area. As the individual fillets continue to be advanced towards the cutter, the skins thereof are cut off. A further advance of the fillets will bring the rollers 67, 68, 69 and 73 in contact therewith and help to maintain the skinned portions thereof in juxtaposed relationship with the cutter 15. The strips 45 are preferably provided with roughened surfaces to obviate transverse slipping of the fillets during the cutting operation. The slab 22 acts as a detent against the further advance of the pusher 31 after said pusher has served its function. The pusher 31 can then be withdrawn for the repetition of the cycle.

Although certain novel features of the invention have been shown and described and are pointed out in the annexed claims, it will be understood that various omissions, substitutions and changes in the several steps of the process and in its operation and in the form and details of the apparatus illustrated may be made by those skilled in the art without departing from the spirit of the invention.

I claim:

1. An apparatus for skinning frozen fish fillets having the skin surface thereof in a substantially plane condition comprising a cutter for removing substantially only the skin from said fillets, a roller yieldably mounted with respect to said cutter and having a resilient periphery, said roller being adapted to hold the skin portion of said fish in cooperative relationship with said cutter.

2. An apparatus for skinning frozen fish fillets having the skin surface thereof in a substantially plane condition comprising a cutter for removing substantially only the skin from said fillets, a roller having a resilient periphery, said roller being adapted to hold the skin portion of said fish in cooperative relationship with said cutter.

3. An apparatus for skinning frozen fish fillets having the skin surface thereof in a substantially plane condition comprising a cutter for removing substantially only the skin from said fillets, a plurality of substantially axially aligned rollers yieldably mounted for independent operation and adapted to hold the skin portion of said fish in cooperative relationship with said cutter.

4. An apparatus for skinning frozen fish fillets having the skin surface thereof in a substantially plane condition comprising a cutter for removing substantially only the skin from said fillets, a first roller yieldably mounted in front of the field of action of said cutter, a second roller yieldably mounted beyond the field of action of said cutter, said rollers being adapted to independently bear against the surface of the fish so as to maintain the skin portion thereof in cooperative relationship with said cutter.

5. An apparatus for skinning frozen fish fillets having the skin surface thereof in a substantially plane condition comprising a cutter for removing substantially only the skin from said fillets, a plurality of series of substantially axially aligned rollers, each of said rollers being yieldably mounted for independent operation and adapted to bear against the surface of the fish so as to maintain the skin portion thereof in cooperative relationship with said cutter.

6. An apparatus for skinning frozen fish fillets having the skin surface thereof in a substantially plane condition comprising a cutter for removing substantially only the skin from said fillets, a shaft, a sleeve loosely mounted on said shaft, an arm connected to said sleeve, a roller rotatably mounted on said arm, a second sleeve fixedly secured to said shaft, a second arm connected to said second sleeve, and a roller mounted on said second arm, said rollers being adapted to independently bear against the surface of the fish so as to maintain the skin portion thereof in cooperative relationship with said cutter.

7. An apparatus for skinning frozen fish fillets having the skin surface thereof in a substantially plane condition comprising a cutter for removing substantially only the skin from said fillets, a trough, a pusher guided in said trough, said pusher being adapted to advance the fish into the field of action of said cutter, and means for maintaining the skin portion of said fish in juxtaposed relationship with said cutter.

8. An apparatus for skinning frozen fish fillets having the skin surface thereof in a substantially plane condition comprising a cutter for removing substantially only the skin from said fillets, a receptacle, a guide rail extending longitudinally intermediate the sides of said receptacle, constituting thereby a pair of adjacent troughs, a pusher cooperating with said guide rail and adapted to advance the fish in each of said troughs into the field of action of said cutting means, and means independently associated with each of said troughs for maintaining the skin portion of the fish in juxtaposed relationship with said cutting means.

9. An apparatus for skinning frozen fish fillets having the skin surface thereof in a substantially plane condition comprising a bed plate having a transverse slot, a cutter for removing the skin of the fish mounted adjacent said slot, a first series of substantially axially aligned rollers on one side of the slot and a second series of substantially axially aligned rollers on the other side of said slot, each of said rollers being yieldably mounted for independent action to bear upon the fish so as to maintain the skin portion thereof in cooperative relationship with said cutter.

10. An apparatus for skinning frozen fish fillets having the skin surface thereof in a substantially plane condition comprising a cutter for removing substantially only the skin from said fillets, a trough in which the fillets are disposed, means for selectively adjusting the width of said trough, a pusher guided in said trough, said pusher being adapted to advance the fish into the field of action of said cutter, and means for disposing the skin portion of said fish in juxtaposed relationship with said cutter.

11. A process of skinning fish fillets which comprises freezing said fillets with the skin thereof in a substantially plane condition and removing the skin from the fillets by moving the rigid, frozen fillets relatively to a skin-removing device with the plane surface of the skin acting as a guide for such movement.

12. A process of skinning fish fillets which comprises freezing said fillets with the skin thereof in a substantially plane condition and removing the skin from the fillets by pushing the rigid, frozen fillets edgewise relatively to a skin-removing device.

In testimony whereof, I have affixed my signature to this specification.

ALEXANDER H. COOKE.